(12) United States Patent
Li et al.

(10) Patent No.: US 12,411,286 B2
(45) Date of Patent: Sep. 9, 2025

(54) EDGE COUPLER AND MANUFACTURING METHOD THEREFOR

(71) Applicant: UNITED MICROELECTRONICS CENTER CO., LTD, Chongqing (CN)

(72) Inventors: Bowen Li, Chongqing (CN); Junbo Feng, Chongqing (CN); Jiguang Zhu, Chongqing (CN); Guowei Cao, Chongqing (CN)

(73) Assignee: UNITED MICROELECTRONICS CENTER CO., LTD, Chongqing (CN)

( * ) Notice: Subject to any disclaimer, the term of this patent is extended or adjusted under 35 U.S.C. 154(b) by 272 days.

(21) Appl. No.: 17/922,959

(22) PCT Filed: Dec. 2, 2021

(86) PCT No.: PCT/CN2021/134925
§ 371 (c)(1),
(2) Date: Nov. 2, 2022

(87) PCT Pub. No.: WO2022/135095
PCT Pub. Date: Jun. 30, 2022

(65) Prior Publication Data
US 2023/0161107 A1 May 25, 2023

(30) Foreign Application Priority Data

Dec. 22, 2020 (CN) .......................... 202011525590.1

(51) Int. Cl.
*G02B 6/30* (2006.01)
*B29D 11/00* (2006.01)

(52) U.S. Cl.
CPC ........ *G02B 6/305* (2013.01); *B29D 11/00663* (2013.01)

(58) Field of Classification Search
CPC .... G02B 6/305; G02B 6/132; G02B 6/12002; G02B 2006/12107; G02B 6/136;
(Continued)

(56) References Cited

U.S. PATENT DOCUMENTS 10,690,845 B1    6/2020  Jacob et al.
10,816,726 B1 *  10/2020 Peng .................... G02B 6/3636
(Continued)

FOREIGN PATENT DOCUMENTS

CN    101641622 A    2/2010
CN    101655576 A    2/2010
(Continued)

*Primary Examiner* — John Bedtelyon
(74) *Attorney, Agent, or Firm* — MASCHOFF BRENNAN; Liang Huang

(57) ABSTRACT

An edge coupler and a fabrication method therefor are provided. The method includes: providing a semiconductor-on-insulator substrate, the semiconductor-on-insulator substrate including a first substrate, an insulating layer on the first substrate, and a semiconductor layer on the insulating layer; patterning the semiconductor layer to form a first waveguide; forming a first dielectric layer on the insulating layer; forming a second dielectric layer on the first dielectric layer and the first waveguide; forming a second waveguide on the second dielectric layer; forming a third dielectric layer covering the second waveguide; bonding the third dielectric layer to a carrier substrate on a side of the third dielectric layer away from the second waveguide; removing the first substrate; and forming a fourth dielectric layer on a surface of the insulating layer.

20 Claims, 16 Drawing Sheets

(58) Field of Classification Search
CPC ........ G02B 2006/12061; G02B 6/1228; G02B 6/13; G02B 6/122; G02B 6/124; G02B 6/14; G02B 6/26; B29D 11/00663
See application file for complete search history.

(56) References Cited

U.S. PATENT DOCUMENTS

| | | |
|---|---|---|
| 11,592,618 B2 * | 2/2023 | Hsia .................. G02B 6/30 |
| 2005/0201683 A1 | 9/2005 | Ghiron et al. |
| 2008/0193080 A1 | 8/2008 | Cheben et al. |

FOREIGN PATENT DOCUMENTS

| | | |
|---|---|---|
| CN | 102385109 A | 3/2012 |
| CN | 105785508 A | 7/2016 |
| CN | 106468810 A | 3/2017 |
| CN | 107290824 A | 10/2017 |
| CN | 107346049 A | 11/2017 |
| CN | 209044108 U | 6/2019 |
| CN | 112630886 A | 4/2021 |
| JP | 2011022464 A | 2/2011 |
| WO | 2017147773 A1 | 9/2017 |

* cited by examiner

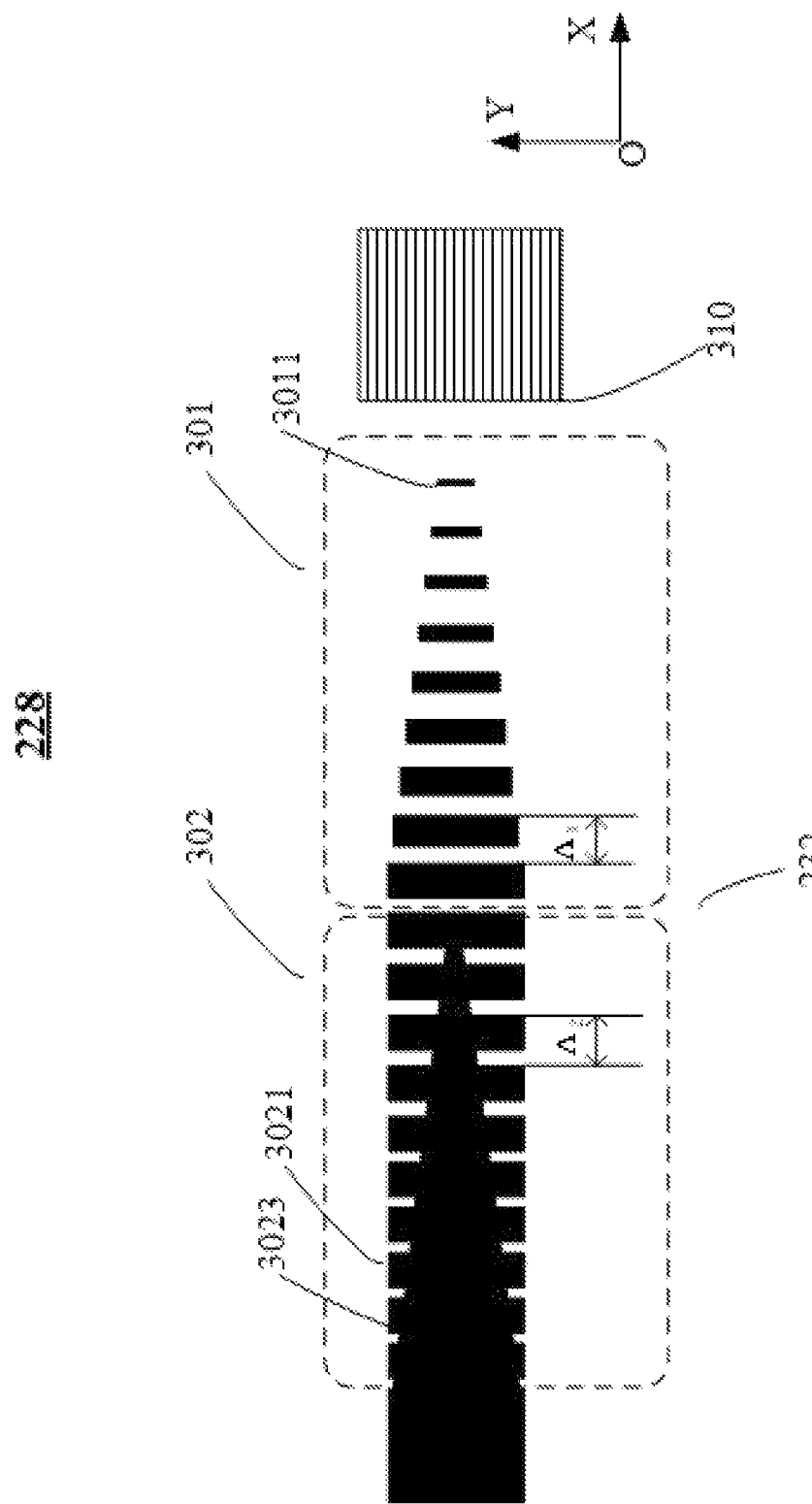

EDGE COUPLER AND MANUFACTURING METHOD THEREFOR

CROSS REFERENCE TO RELATED APPLICATIONS

The present application is a U.S. National Stage application under 35 U.S.C. § 371 of International Application No. PCT/CN2021/134925, filed on Dec. 2, 2021, which is based upon and claims priority to Chinese Application No. 202011525590.1 filed on Dec. 22, 2020, which is incorporated by reference in its entirety for all purposes.

TECHNICAL FIELD

The present disclosure relates to the technical field of semiconductors, and in particular, to an edge coupler and a fabrication method therefor.

BACKGROUND

Integrated silicon photonics is widely used in key fields such as large-capacity communications, optical signal processing, and avionics systems. At present, one of the key issues that inhibits the widespread application of silicon photonic chips is coupling of an optical fiber to a silicon photonic chip.

In some cases, a mode spot size of an optical waveguide in a silicon photonic chip is quite different from a mode spot size of an optical fiber, and a fiber-to-silicon photonic coupling loss caused by a mode spot mismatch is high. Therefore, the coupling of the optical fiber to the optical waveguide in the chip can usually be implemented by a coupler.

A coupler in the related art has problems such as low coupling efficiency. In order to improve the coupling efficiency, key parts of some couplers are in a suspended state. As a result, the key parts have a low structural reliability and are easily broken during wafer dicing and chip packaging, which increases the costs and inhibits the yield. In addition, some couplers have complex structures, for which the growth of multiple layers of materials and a distance between them need to be precisely controlled, resulting in higher process requirements and increased costs.

SUMMARY

It will be advantageous to provide a mechanism to alleviate, mitigate or even eliminate one or more of the above-mentioned problems.

According to some embodiments of the present disclosure, a fabrication method for an edge coupler is provided, the method including: providing a semiconductor-on-insulator substrate, the semiconductor-on-insulator substrate including a first substrate, an insulating layer on the first substrate, and a semiconductor layer on the insulating layer; patterning the semiconductor layer to form a first waveguide; forming a first dielectric layer on the insulating layer; forming a second dielectric layer on the first dielectric layer and the first waveguide; forming a second waveguide on the second dielectric layer; forming a third dielectric layer covering the second waveguide; bonding the third dielectric layer to a carrier substrate on a side of the third dielectric layer away from the second waveguide; removing the first substrate; and forming a fourth dielectric layer on a surface of the insulating layer.

According to some embodiments of the present disclosure, an edge coupler is further provided, the edge coupler including: a first waveguide; a first dielectric layer adjacent to the first waveguide; a second dielectric layer on the first waveguide and the first dielectric layer; a second waveguide on the second dielectric layer; a third dielectric layer covering the second waveguide; a carrier substrate on the third dielectric layer; an insulating layer under the first waveguide and the first dielectric layer; and a fourth dielectric layer under the insulating layer.

These and other aspects of the present disclosure will be clear from the embodiments described below, and will be clarified with reference to the embodiments described below.

BRIEF DESCRIPTION OF THE DRAWINGS

More details, features, and advantages of the present disclosure are disclosed in the following description of embodiments in conjunction with the drawings, in which:

FIG. 2A to FIG. 2K are schematic sectional views of example structures of an edge coupler formed in various steps of a fabrication method for an edge coupler according to an embodiment of the present disclosure;

FIG. 3A to FIG. 3C are schematic structural diagrams of a second waveguide according to an embodiment of the present disclosure.

DETAILED DESCRIPTION

Figure 1:
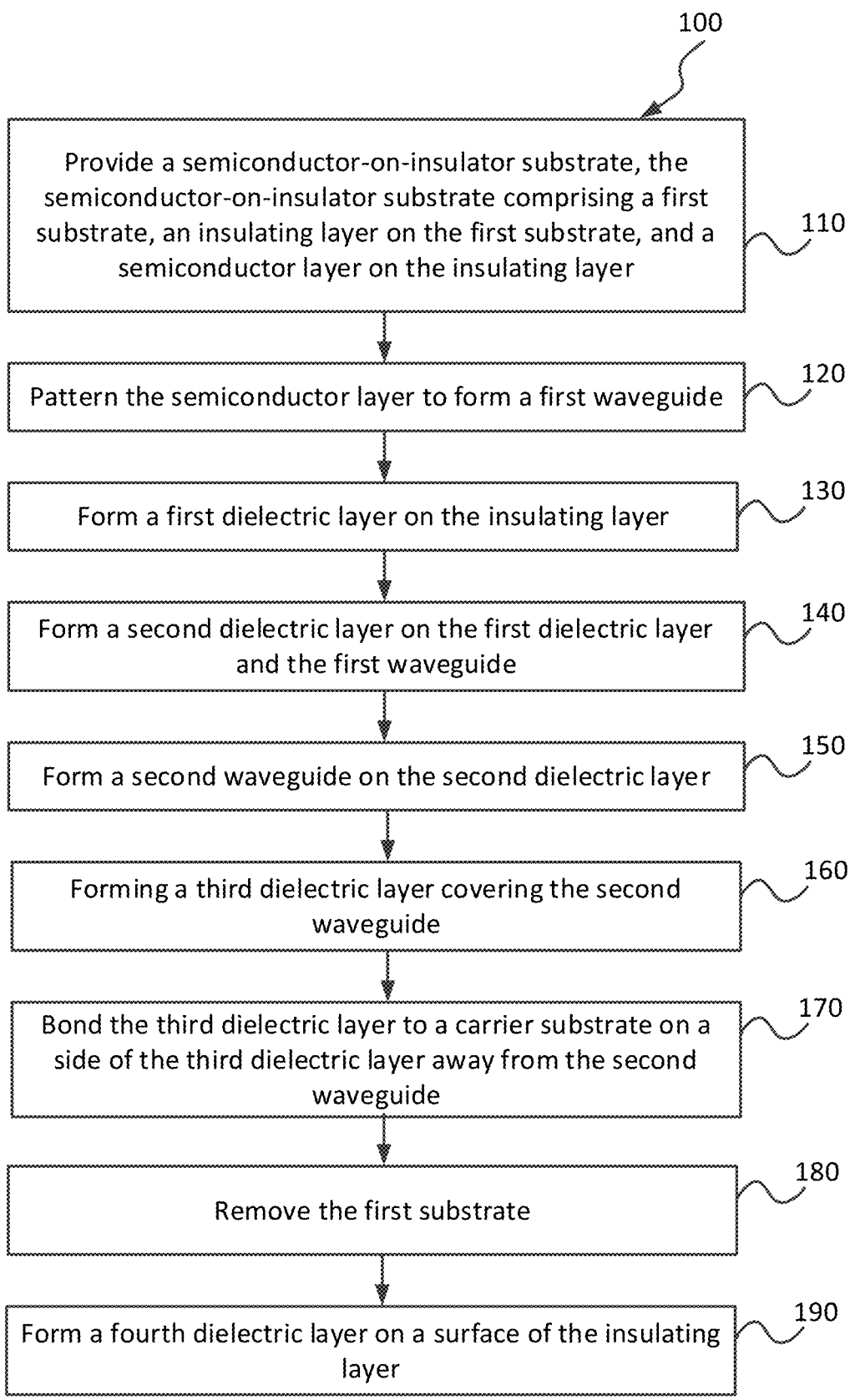
FIG. 1 is a flowchart of a fabrication method for an edge coupler according to an embodiment of the present disclosure.

It is to be understood that although terms such as first, second and third may be used herein to describe various elements, components, areas, layers and/or part, these elements, components, areas, layers and/or part should not be limited by these terms. These terms are merely used to distinguish one element, component, area, layer or part from another. Therefore, a first element, component, area, layer or part discussed below may be referred to as a second element, component, area, layer or part without departing from the teaching of the present disclosure.

Spatially relative terms such as "under", "below", "lower", "beneath", "above" and "upper" may be used herein for ease of description to describe the relationship between one element or feature and another element(s) or feature(s) as illustrated in the figures. It will be understood that these spatially relative terms are intended to cover different orientations of a device in use or operation in addition to the orientations depicted in the figures. For example, if the device in the figures is turned over, an element described as being "below other elements or features" or "under other elements or features" or "beneath other elements or features" will be oriented to be "above other elements or features". Thus, the exemplary terms "below" and "beneath" may cover both orientations "above" and "below". Terms such as "before" or "ahead" and "after" or "then" may similarly be used, for example, to indicate the order in which light passes through elements. The device may be oriented in other ways (rotated by 90 degrees or in other orientations), and the spatially relative descriptors used herein are interpreted correspondingly. In addition, it will also be understood that when a layer is referred to as being "between two layers", it may be the only layer between the two layers, or there may also be one or more intermediate layers.

The terms used herein are merely for the purpose of describing specific embodiments and are not intended to limit the present disclosure. As used herein, the singular forms "a", "an", and "the" are intended to include plural forms as well, unless otherwise explicitly indicted in the context. It is to be further understood that the terms "comprise" and/or "include", when used in this specification, specify the presence of described features, entireties, steps, operations, elements and/or components, but do not exclude the presence or addition of one or more other features, entireties, steps, operations, elements, components and/or groups thereof. As used herein, the term "and/or" includes any and all combinations of one or more of the associated listed items, and the phrase "at least one of A and B" refers to only A, only B, or both A and B.

It is to be understood that when an element or a layer is referred to as being "on another element or layer", "connected to another element or layer", "coupled to another element or layer", or "adjacent to another element or layer", the element or layer may be directly on another element or layer, directly connected to another element or layer, directly coupled to another element or layer, or directly adjacent to another element or layer, or there may be an intermediate element or layer. On the contrary, when an element is referred to as being "directly on another element or layer", "directly connected to another element or layer", "directly coupled to another element or layer", or "directly adjacent to another element or layer", there is no intermediate element or layer. However, under no circumstances should "on" or "directly on" be interpreted as requiring one layer to completely cover the underlying layer.

Embodiments of the present disclosure are described herein with reference to schematic illustrations (and intermediate structures) of idealized embodiments of the present disclosure. Because of this, variations in an illustrated shape, for example as a result of manufacturing techniques and/or tolerances, should be expected. Therefore, the embodiments of the present disclosure should not be interpreted as being limited to a specific shape of an area illustrated herein, but should comprise shape deviations caused due to manufacturing, for example. Therefore, the area illustrated in a figure is schematic in nature, and the shape thereof is neither intended to illustrate the actual shape of the area of a device, nor to limit the scope of the present disclosure.

Unless otherwise defined, all terms (including technical and scientific terms) used herein have the same meanings as commonly understood by those of ordinary skill in the art to which the present disclosure belongs. It is to be further understood that the terms such as those defined in commonly used dictionaries should be interpreted as having meanings consistent with the meanings thereof in relevant fields and/or in the context of this specification, and will not be interpreted in an ideal or too formal sense, unless thus defined explicitly herein.

As used herein, the term "substrate" may refer to a substrate of a cut wafer, or may refer to a substrate of an uncut wafer. Similarly, the terms "chip" and "bare die" are used interchangeably, unless such interchange may lead to a conflict. It should be understood that the term "film" includes a layer and should not be construed as indicating a vertical or horizontal thickness, unless otherwise specified. It should be noted that the thicknesses of various material layers of a hydrophone shown in the figures are only schematic representations, and do not represent actual thicknesses.

A coupler can be used to implement optical coupling between an optical fiber and a chip. In actual application, the optical coupling can be implemented by using a surface coupler or an edge coupler. For example, a solution used by the surface coupler is based on a diffraction grating, which mainly utilize the grating structure to couple light into an optical waveguide in a diffracted form. However, a length of a conventional grating coupler is mostly several hundreds of microns. Although such a length makes a leakage factor of the grating very small, a bandwidth of the grating coupler is limited. In order to overcome the defect of the surface coupler, the edge coupler is sometimes considered. However, a key part of the current edge coupler is usually in a suspended state, and the core part of the coupler needs to be supported by a beam. As a result, the key part has a low structural reliability and is easily broken during wafer dicing and chip packaging, which increases the costs and inhibits the yield. In addition, some edge couplers have complex structures, for which the growth of multiple layers of materials and a distance between them need to be precisely controlled, resulting in higher process requirements and increased costs.

Embodiments of the present disclosure provide a fabrication method for an edge coupler and an edge coupler. Fabricating an edge coupler using a method according to an embodiment of the present disclosure helps improve coupling efficiency, improve reliability, reduce device size, and reduce the process cost.

FIG. 1 is a flowchart of a fabrication method 100 for an edge coupler according to an embodiment of the present disclosure, and FIG. 2A to FIG. 2K are schematic diagrams of example structures formed through various steps of the method 100. The method 100 is described below with reference to FIG. 1 and FIG. 2A to FIG. 2K.

Figure 2A:
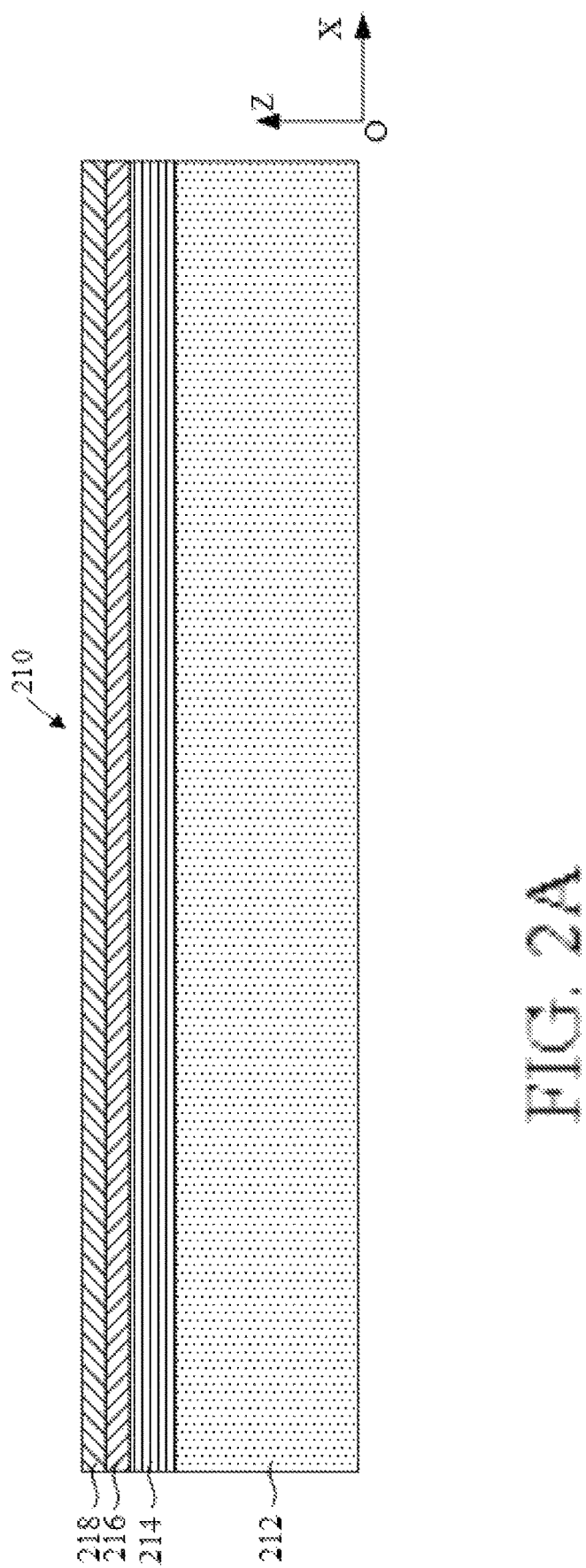

In step 110, a semiconductor-on-insulator substrate 210 is provided. As shown in FIG. 2A, the semiconductor-on-insulator substrate 210 includes a first substrate 212, an insulating layer 214 on the first substrate 212, and a semiconductor layer 216 on the insulating layer 214.

In some embodiments, the semiconductor-on-insulator substrate 210 may be a silicon-on-insulator (SOI) substrate. The SOI substrate is readily available commercially and has good characteristics for an integrated photonic device. In such an embodiment, the first substrate 212 may be made of any suitable material (for example, silicon or germanium). The insulating layer 214 may be an oxide material, a thermal oxide material, a nitride material, or the like. For example, the insulating layer 214 may be silicon dioxide. In an example, the insulating layer 214 may have a thickness of about 1 µm to 5 µm. The semiconductor layer 216 may be referred to as a semiconductor device layer in which various semiconductor components are formed. In some embodiments, the semiconductor layer 216 may be made of silicon, but the present disclosure is not limited thereto. In an example, the semiconductor layer 216 may have a thickness of about 200 nm to 250 nm.

In some embodiments, as shown in FIG. 2A, in addition to the structure of the semiconductor-on-insulator substrate 210, an additional optional feature, a barrier layer 218, is shown. The barrier layer 218 may be formed in an optional step after step 110. For example, according to some embodiments, after the semiconductor-on-insulator substrate 210 is provided, the barrier layer 218 may be formed on the semiconductor layer 216. According to some embodiments, a material of the barrier layer 218 may be titanium nitride or polysilicon. However, it should be understood that a barrier layer 218 of other materials are also possible.

Figure 2B:
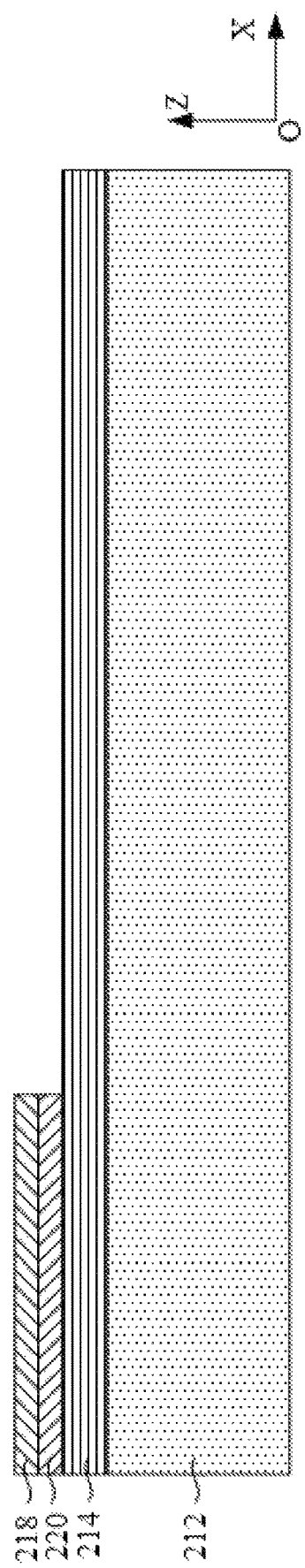

In step 120, the semiconductor layer 216 is patterned to form a first waveguide 220, as shown in FIG. 2B.

In some examples, the semiconductor layer 216 may be patterned through processes such as photolithography and etching. For example, in an embodiment in which the semiconductor-on-insulator substrate 210 is a standard SOI substrate, a photoresist pattern for the first waveguide is formed on the semiconductor-on-insulator substrate 210 through steps such as spinning, exposure, development, and baking. Then a photoresist is used as a mask, and the semiconductor layer 216 is etched through an etching process to form the first waveguide 220. Next, photoresist removal and cleaning are performed. The etching process may be, for example, wet etching or dry etching. Depending on etching rates for different crystallographic orientations in an etching solution, the wet etching may be classified as isotropic etching and anisotropic etching. The dry etching uses a physical method (for example, sputtering or ion etching) or a chemical method (for example, reactive ion etching).

It should be understood that the above-described manner of patterning the semiconductor layer to form the first waveguide is merely an example, and the present disclosure is not limited thereto. Any suitable process capable of patterning the semiconductor layer can be selected depending on specific applications and/or requirements.

As described above, according to some embodiments, after the semiconductor-on-insulator substrate 210 is provided, the barrier layer 218 may be formed on the semiconductor layer 216. That is, the barrier layer 218 may be formed on the semiconductor layer 216 before the patterning of the semiconductor layer 216.

FIG. 2B shows the formed barrier layer 218. As shown in FIG. 2B, in an embodiment in which the barrier layer 218 is formed, patterning the semiconductor layer 216 to form the first waveguide 220 may include: patterning the barrier layer 218 and the semiconductor layer 216 to form the first waveguide 220.

According to some embodiments, the first waveguide 220 may be made of a material selected from the group consisting of silicon, silicon oxynitride, silicon nitride, lithium niobate, polymer, and indium phosphide (InP). The first waveguide made of the above-mentioned materials can be compatible with an existing semiconductor process, such as a CMOS process, which helps reduce the process cost.

Figure 2C:
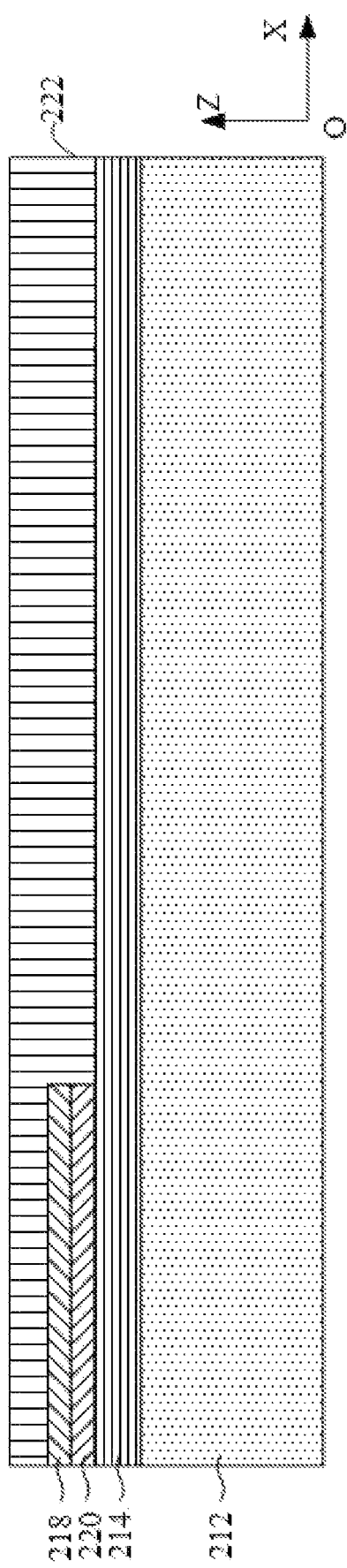

In step 130, a first dielectric layer 223 is formed on the insulating layer 214, as shown in FIG. 2C.

Figure 2D:
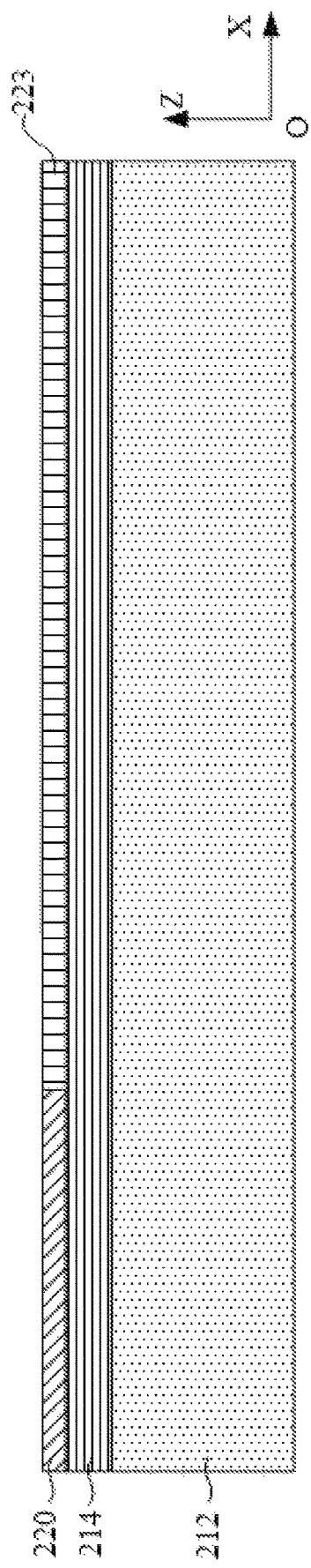

As described above, according to some embodiments, the barrier layer 218 may be formed on the semiconductor layer 216 before the patterning of the semiconductor layer 216. In an embodiment in which the barrier layer 218 is formed, as shown in FIG. 2C and FIG. 2D, forming the first dielectric layer 223 on the insulating layer 214 includes: forming a first dielectric material layer 222 covering the barrier layer 218 and the insulating layer 214; planarizing the first dielectric material layer 222 until the barrier layer 218 is completely removed, thereby forming the first dielectric layer 223. A surface of the first dielectric layer 223 away from the first substrate 212 is substantially flush with a surface of the first waveguide 220 away from the first substrate 212. FIG. 2D is a schematic diagram after the first dielectric material layer 222 covering the barrier layer 218 and the insulating layer 214 is formed. It should be understood that although a surface of the first dielectric material layer 222 shown in FIG. 2D is a flat interface, its surface, due to the fabrication process, may not be flat in an actual fabrication process. Therefore, it may be necessary to planarize the first dielectric material layer 222 to obtain a substantially smooth and flat surface.

A surface of the first dielectric layer 223 away from the first substrate 212 is substantially flush with a surface of the first waveguide 220 away from the first substrate 212. For example, referring to the orientation shown in FIG. 2D, an upper surface of the first dielectric layer 223 is substantially flush with an upper surface of the first waveguide 220.

In the present disclosure, the term "substantially flush" encompasses "flush" and deviations from "flush" due to fabrication process-induced errors. It should be understood that, due to the fabrication process, it is possible that for the precision of the surfaces of the first dielectric layer and the first waveguide fluctuates within an allowable range. However, they are substantially smooth and flat surfaces.

According to some embodiments, the first dielectric material layer 222 may be formed by deposition and planarized by chemical mechanical polishing until the barrier layer 218 is completely removed, resulting in a smooth surface.

In the foregoing embodiment including the barrier layer 218, the barrier layer 218 can protect the first waveguide 220 from being damaged during the planarization process, and can act as a stop layer for the planarization process, that is, the planarization process can be stopped once the barrier layer 218 is completely removed. This can ensure the smoothness of the upper surface of the first dielectric layer 223, and can protect the first waveguide 220 from being damaged during the planarization process.

According to some embodiments, the first dielectric layer 223 may be made of a material selected from the group consisting of oxide, oxynitride, and polymer. For example, the first dielectric layer 223 may be made of photo-epoxy resin. According to another example, the first dielectric layer may be made of silicon dioxide.

Figure 2E:
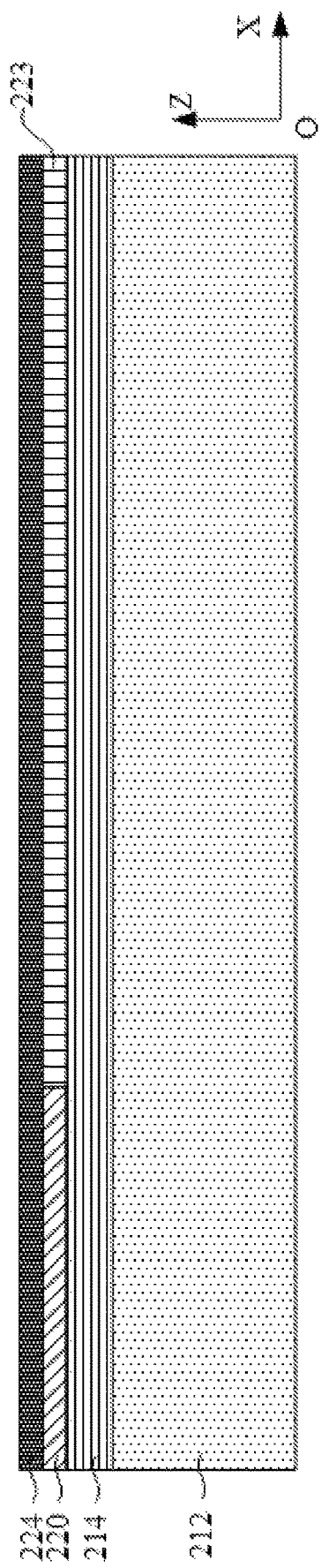

In step 140, a second dielectric layer 224 is formed on the first dielectric layer 223 and the first waveguide 220, as shown in FIG. 2E.

In some examples, the second dielectric layer 224 may be formed on the first dielectric layer 223 and the first waveguide 220 by deposition.

According to some embodiments, the second dielectric layer 224 may be made of a material selected from the group consisting of oxide, thermal oxide, and nitride. For example, a material of the second dielectric layer 224 may be silicon dioxide. However, it should be understood that other materials used for the second dielectric layer are also possible, which is not limited herein.

The second dielectric layer 224 may, for example, serve as a spacer layer between the first waveguide 220 and a second waveguide (described later). According to some embodiments, the thickness of the second dielectric layer may be determined based on at least the material of the first waveguide, the material of the second waveguide, the material of the second dielectric layer, and the expected coupling efficiency. For example, in order to achieve the coupling efficiency required for evanescent field coupling between the first waveguide and the second waveguide, after the selection of the material of the second dielectric layer and the materials and structures of the first waveguide and the second waveguide, a finite-difference time-domain (FDTD) method may be used to calculate the thickness of the second dielectric layer that meets the desired coupling efficiency (for example, the optimal coupling efficiency).

As described above, after the first dielectric layer 223 is formed, the second dielectric layer 224 is formed on the first dielectric layer 223 and the first waveguide 220. That is, the first dielectric layer 223 and the second dielectric layer 224 are formed separately. Compared with a case that one dielectric layer is integrally formed by using the same material to cover the first waveguide, separately forming two dielectric layers helps obtain a thickness of the second dielectric layer 224 within a desired range, thereby meeting the expected design requirements, and improving the coupling efficiency. In addition, because the material for forming the first dielectric layer and the material for forming the second dielectric layer can be selected separately, a flexible design can be implemented, which helps meet requirements of different applications.

Figure 2F:
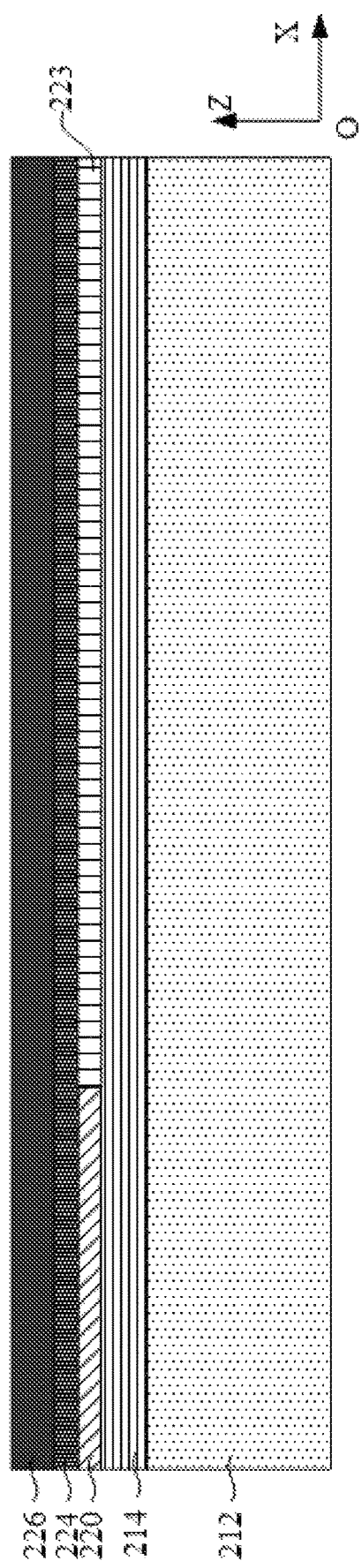
Figure 2G:
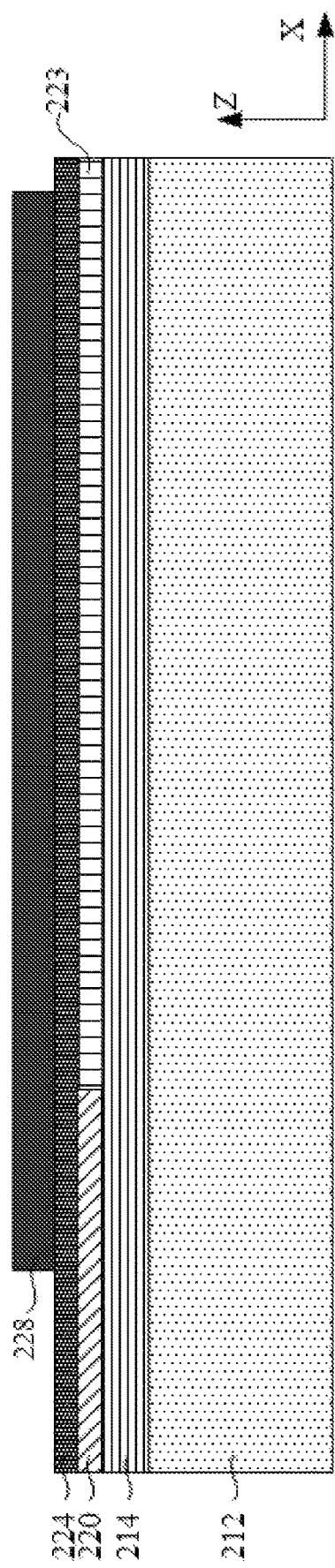

In step 150, a second waveguide 228 is formed on the second dielectric layer 224, as shown in FIG. 2G.

According to some embodiments, forming the second waveguide 228 on the second dielectric layer 224 includes: forming a second waveguide material layer 226 on the second dielectric layer 224; and patterning the second waveguide material layer 226 to form the second waveguide 228, as shown in FIG. 2F and FIG. 2G.

According to some embodiments, the second waveguide 228 may be made of silicon nitride or silicon oxynitride. The second waveguide made of silicon nitride or silicon oxynitride can be compatible with an existing semiconductor process, such as a CMOS process. In addition, the second waveguide made of silicon nitride or silicon oxynitride has lower requirements on the precision of a photolithography machine, so that the process cost can be further reduced.

According to some examples, the second waveguide material layer 226 may be formed on the second dielectric layer 224 by LPCVD (low pressure chemical vapor deposition) or PECVD (plasma-enhanced chemical vapor deposition). Then, on the formed second waveguide material layer 226, a photoresist pattern for the second waveguide 228 is formed through steps such as spinning, exposure, development, and baking. Next, a photoresist is used as a mask, and the second waveguide material layer 226 is etched to pattern the second waveguide material layer 226 to form the second waveguide 228. Next, photoresist removal and cleaning are performed.

It should be understood that the above-described manner of forming the second waveguide is merely exemplary, and the present disclosure is not limited thereto. Any suitable process capable of forming the second waveguide 228 can be selected depending on specific applications and/or requirements.

Figure 2H:
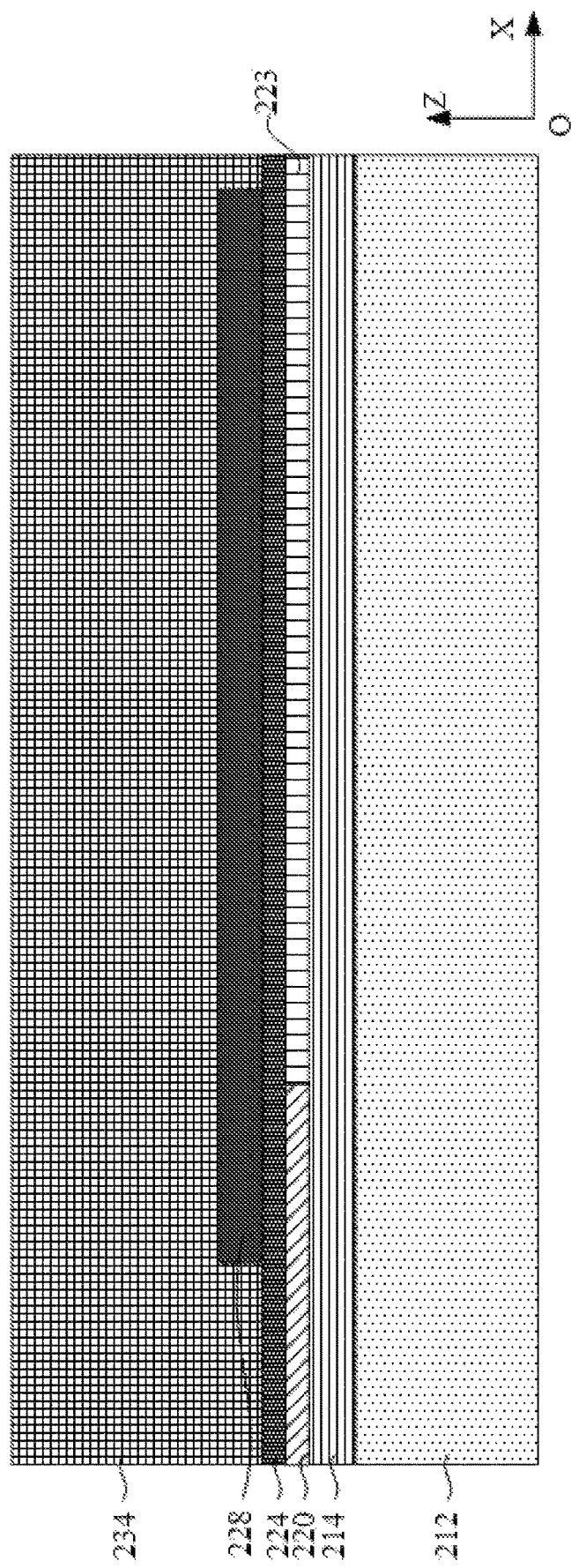
Figure 21:
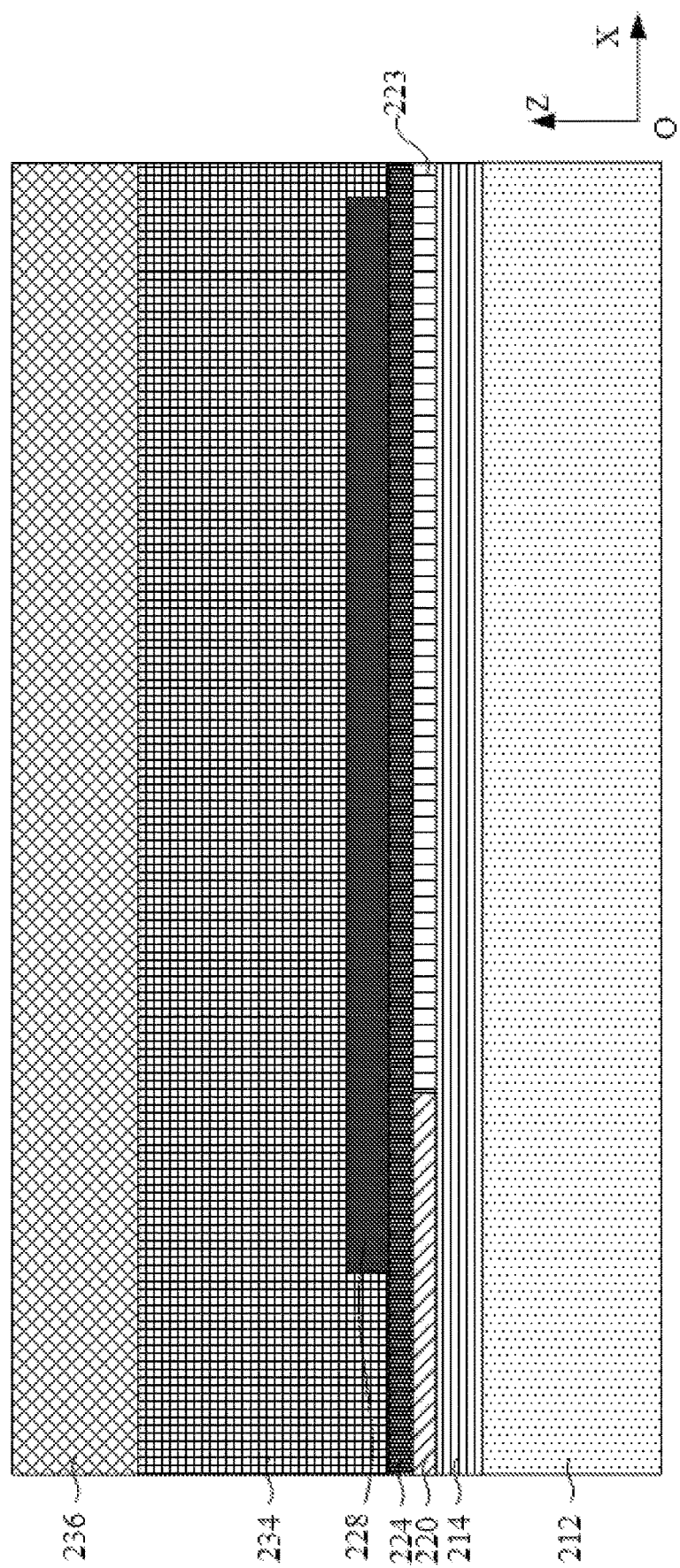

In step 160, a third dielectric layer 234 covering the second waveguide 228 is formed, as shown in FIG. 2H.

The third dielectric layer 234 may be used, for example, as an upper cladding layer of the edge coupler. According to some embodiments, the third dielectric layer 234 may be made of a material selected from the group consisting of oxide, thermal oxide, and nitride. For example, the third dielectric layer 234 may be made of a silicon dioxide material.

According to some embodiments, the third dielectric layer 234 and the first dielectric layer 223 may be made of the same material. In an embodiment, after the third dielectric layer 234 is formed, a planarization process such as chemical mechanical polishing may be used to planarize a surface of the third dielectric layer 234.

In step 170, the third dielectric layer 234 is bonded to a carrier substrate 236 on a side of the third dielectric layer 234 away from the second waveguide 228, as shown in FIG. 2I.

In some examples, the carrier substrate 236 may be made of any suitable material including, but not limited to, silicon, germanium, glass, ceramic, and the like. This is not limited herein.

FIG. 2I is a schematic diagram after the bonding of the carrier substrate 236 to an upper surface of the third dielectric layer 234. As described later, the carrier substrate 236 can provide support during the subsequent removal of the first substrate, thereby avoiding damage to the formed waveguide structures and the like.

Figure 2J:
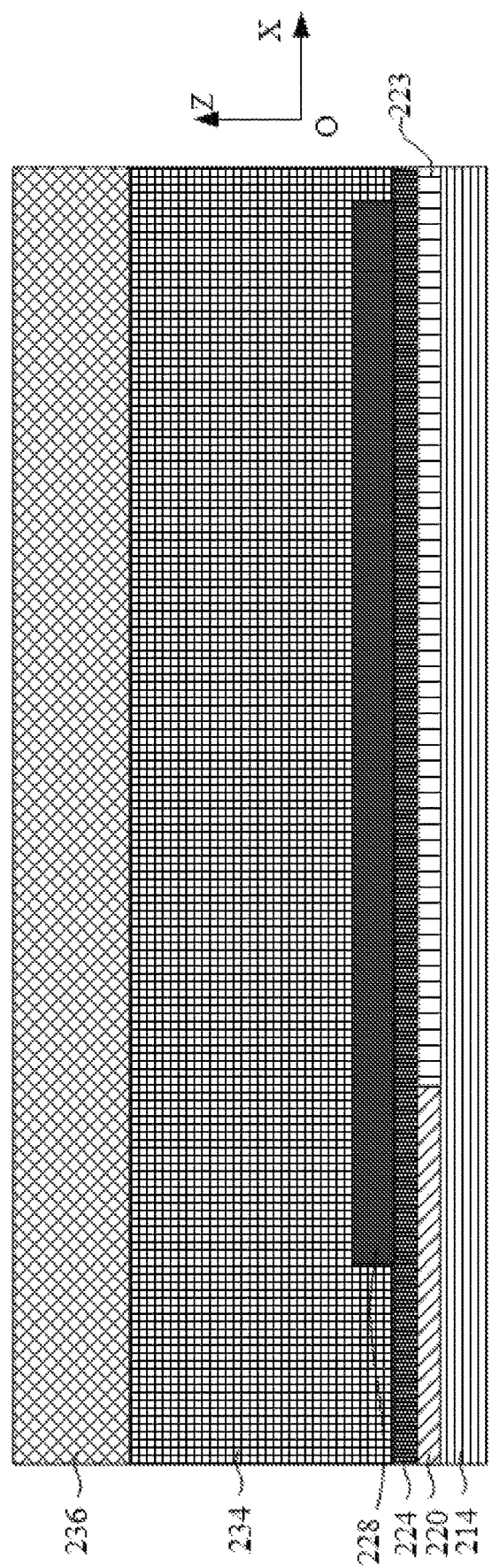

In step 180, the first substrate 212 is removed, as shown in FIG. 2J.

In some examples, the first substrate 212 may be removed using any suitable technique including, but not limited to, grinding, milling, chemical mechanical polishing (CMP), dry polishing, electrochemical etching, wet etching, plasma-assisted chemical etching (PACE), atmospheric downstream plasma etching (ADPE), etc. An edge coupler of a smaller size can be obtained by removing the first substrate 212, and it helps improve electrical performance and heat dissipation performance.

In some embodiments, the structure shown in FIG. 2I may be flipped over, and then the first substrate 212 is removed.

Figure 2K:
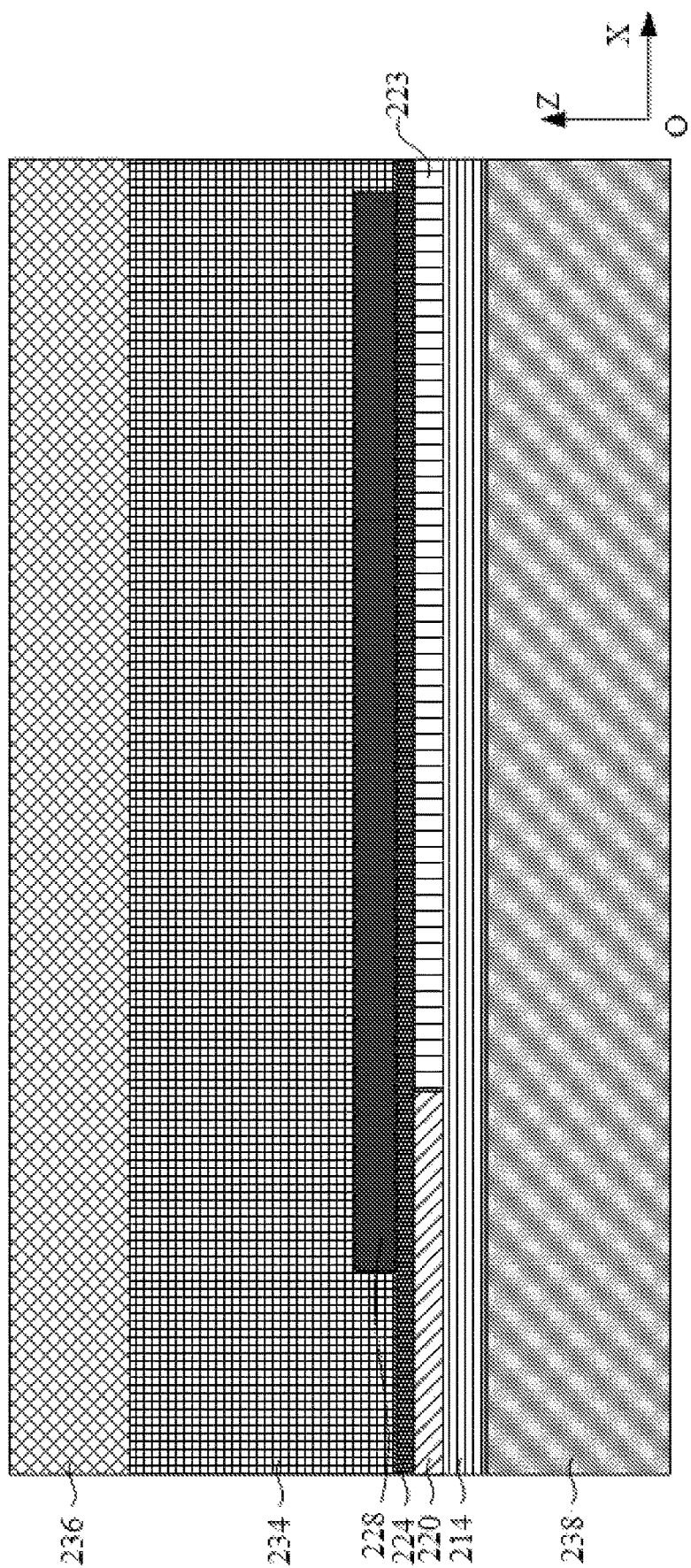

In step 190, a fourth dielectric layer 238 is formed on a surface of the insulating layer 214, as shown in FIG. 2K.

According to some embodiments, the fourth dielectric layer 238 is made of a material selected from the group consisting of oxide, thermal oxide, and nitride. However, it should be understood that other materials used for the fourth dielectric layer 238 are also possible, which is not limited herein.

According to some embodiments, the material of the fourth dielectric layer 238 may be selected to have the same or similar refractive index as the material of the insulating layer 214. In an embodiment, after the fourth dielectric layer 238 is formed, a planarization process such as chemical mechanical polishing may be used to planarize a surface of the fourth dielectric layer 238. The fourth dielectric layer 238 may be used, for example, as a lower cladding layer of the edge coupler.

The embodiments of the fabrication method for an edge coupler have been described, and the structure of the resulting edge coupler will be clear. Hereinafter, for the sake of completeness, embodiments of the edge coupler are described with reference to FIG. 2K. The embodiments of the edge coupler can provide the same or corresponding advantages as the method embodiments, and a detailed description of these advantages is omitted for the sake of conciseness.

According to some embodiments, as shown in FIG. 2K, the edge coupler may include: a first waveguide 220; a first dielectric layer 223 adjacent to the first waveguide 220; a second dielectric layer 224 on the first waveguide 220 and the first dielectric layer 223; a second waveguide 228 on the second dielectric layer 224; a third dielectric layer 234 covering the second waveguide 228; a carrier substrate 236 on the third dielectric layer 234; an insulating layer 214 under the first waveguide 220 and the first dielectric layer 223; and a fourth dielectric layer 238 under the insulating layer 214.

A schematic structure of the second waveguide 228 according to an embodiment of the present disclosure is described below with reference to FIG. 3. FIG. 3A to FIG. 3C are schematic diagrams of an example structure of a second waveguide 228 according to an embodiment of the present disclosure.

Figure 3A:
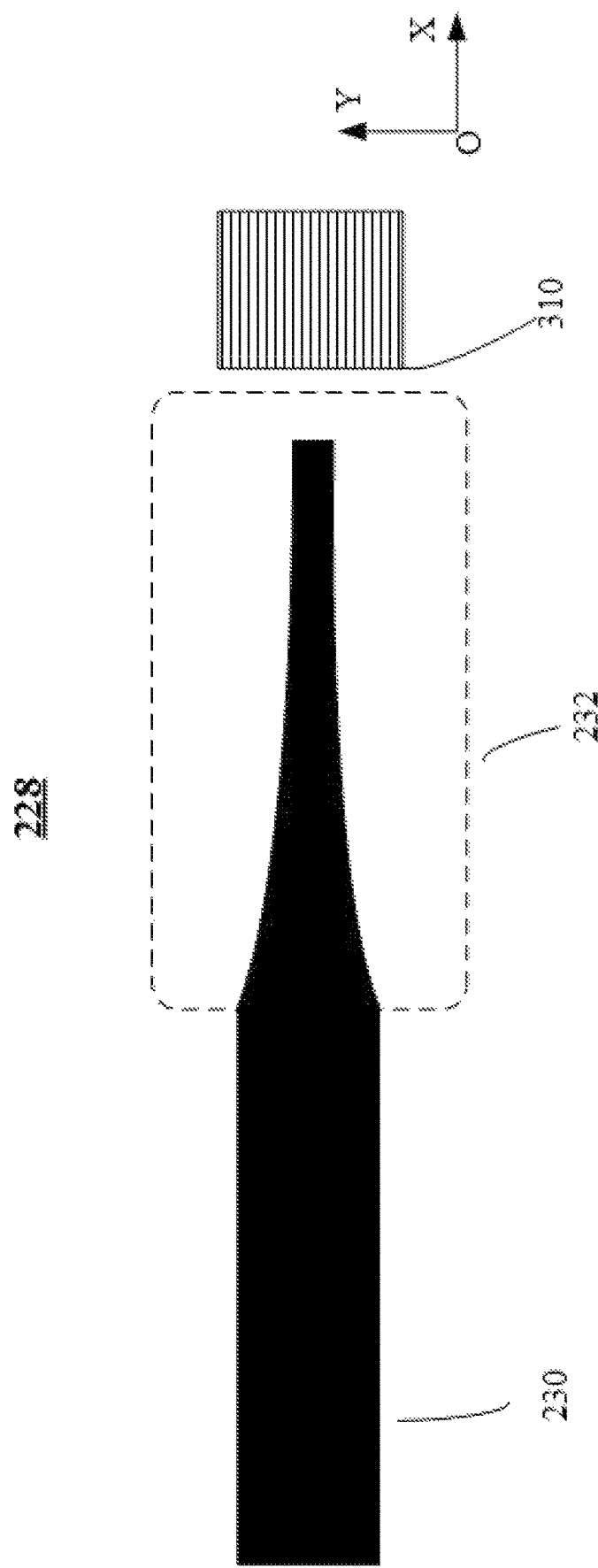
Figure 3B:
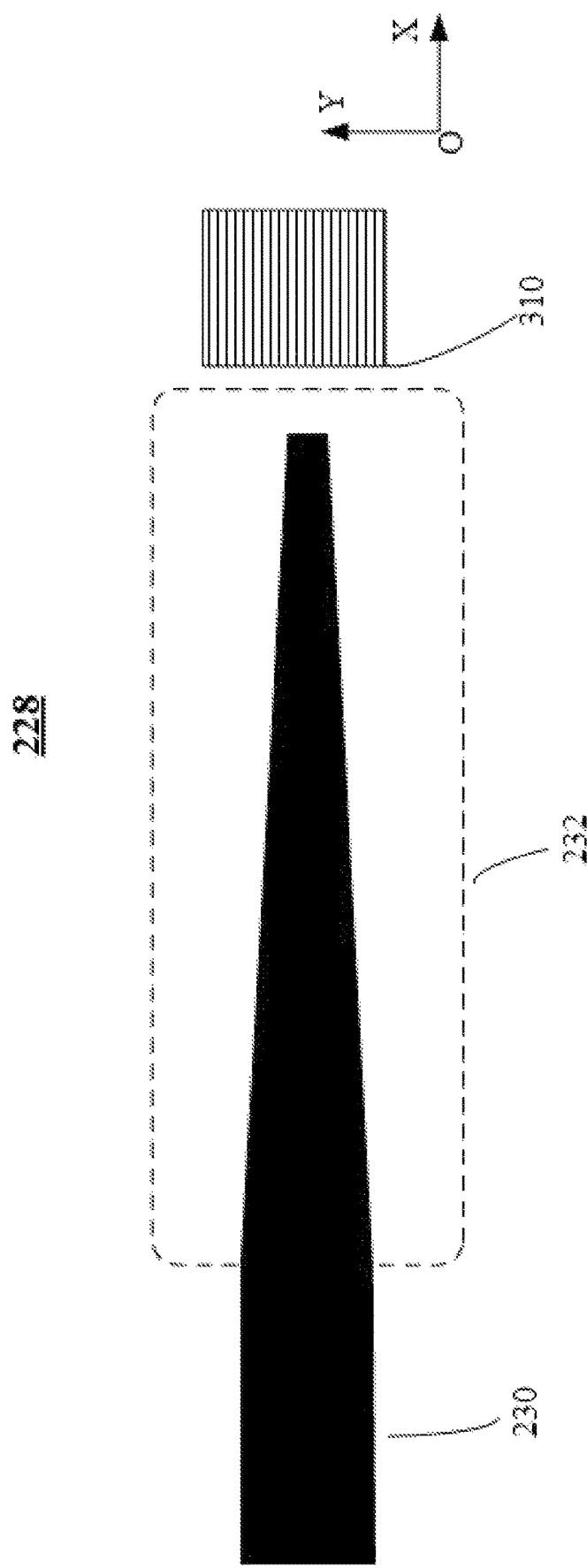

As shown in FIG. 3A to FIG. 3C, according to some embodiments, the second waveguide 228 includes a conversion waveguide 232 and a transmission waveguide 230. The conversion waveguide 232 is configured to perform mode spot conversion on light received from an optical fiber 310, and transmit the light subjected to the mode spot conversion to the transmission waveguide 230. At least part of the transmission waveguide 230 is vertically aligned with at least part of the first waveguide, so as to couple light transmitted in the transmission waveguide 230 into the first waveguide.

According to some embodiments, at least part of the conversion waveguide 232 gradually decreases in size in a direction perpendicular to the direction toward the optical fiber 310.

According to some embodiments, the conversion waveguide 232 is a linear tapered waveguide, a nonlinear tapered waveguide, or a subwavelength grating. However, it should be understood that conversion waveguides of other structures are also possible, which is not limited herein.

FIG. 3A shows an example in which the conversion waveguide 232 is a nonlinear tapered waveguide. The nonlinear tapered waveguide 232 gradually decreases in size in the direction (e.g., the Y direction) perpendicular to the direction toward the optical fiber 310. For example, the upper and lower sides of the nonlinear tapered waveguide 232 may be parabolic-like or hyperbolic. However, it should be understood that nonlinear tapered waveguides of other shapes are also possible, which is not limited herein.

FIG. 3B shows an example in which the conversion waveguide 232 is a linear tapered waveguide. The linear tapered waveguide 232 gradually decreases in size in the direction (e.g., the Y direction) perpendicular to the direction toward the optical fiber 310.

FIG. 3C shows an example in which the conversion waveguide 232 is a subwavelength grating. The subwavelength grating may include a first grating portion 301 and a second grating portion 302. The first grating portion 301 may include a plurality of first grating structural units 3011 arranged with a first grating period (also referred to as grating constant) $A_1$, and the plurality of first grating structural units 3011 gradually decrease in size in the direction toward the optical fiber 310 (e.g., the X direction) and the direction (e.g., the Y direction) perpendicular to the direction toward the optical fiber 310. The second grating portion 302 may include a plurality of second grating structural units 3021 arranged with a second grating period $A_2$ and a tapered unit 3023 connected to the plurality of second grating structural units 3021. The plurality of second grating structural units 3021 are the same in size, and the tapered unit 3023 gradually decreases in size in the direction (e.g., the Y direction) perpendicular to the direction toward the optical fiber 310. For example, the tip of the tapered unit 3023 faces the optical fiber.

According to the embodiments of the present disclosure, compared with a conventional waveguide of a tapered structure, the subwavelength grating structure included in the second waveguide can improve an alignment tolerance, reduce the fabrication difficulty of the edge coupler, and reduce the size of the edge coupler.

An equivalent refractive index of the subwavelength grating can be adjusted by changing the size of the grating structural unit and a corresponding duty cycle (a ratio of the grating structural unit to the grating period), so that during transmission along the subwavelength grating, an optical signal can be gradually converted from an initial large mode field mode spot to a small mode field mode spot that can be bound by the transmission waveguide 230, thereby implementing mode spot conversion of light from the optical fiber 310 to the transmission waveguide 230.

In some embodiments, as shown in FIG. 3C, a geometric size of a first grating structural unit closest to the optical fiber 310 among the plurality of first grating structural units 3011 may be determined based on a mode spot diameter of the optical fiber 310.

In order to better implement a mode spot match between the subwavelength grating and the optical fiber 310, the geometric size of the first grating structure unit closest to the optical fiber 310 among the plurality of first grating structural units 3011 may be set based on the diameter of a mode spot of light output by the optical fiber 310, thereby improves the matching degree of the subwavelength grating with the optical fiber 310. For example, a method of eigenmode simulation may be used to calculate a parameter for implementing the maximum mode spot match between the optical fiber 310 and the first grating structural unit closest to the optical fiber 310 (i.e., the tip of the subwavelength grating 232) among the plurality of first grating structural units 3011, and based on this, the geometric size of the first grating structural unit closest to the optical fiber 310 among the plurality of first grating structural units 3011 is determined.

In some embodiments, the tip of the subwavelength grating is at a specific distance from an end face of the edge coupler on the same side. This distance is to ensure high optical quality and high coupling efficiency of the tip of the subwavelength grating when a deep etching process is used to connect the optical fiber.

In some embodiments, an end face of the first grating structural unit closest to the optical fiber 310 among the plurality of first grating structural units 3011 is square. The end face of the first grating structural unit closest to the optical fiber 310 among the plurality of first grating structural units 3011 is set to be square, such that the subwavelength grating can be better matched with an end face of the optical fiber such as a standard single-mode optical fiber, thereby implementing low polarization loss transmission of light in the optical fiber.

However, it can be understood that it is also possible for the end face of the first grating structural unit closest to the optical fiber 310 to be in other shapes (for example, a rectangle), which is not limited herein.

In some embodiments, a duty cycle of the first grating portion 301 may vary in the direction (e.g., the X direction) toward the optical fiber 310.

For example, as shown in FIG. 3C, it is assumed that the first grating period (also referred to as a grating constant) of the first grating portion 301 is $A_1$. The first grating structural unit 3011 is shown as the black part in FIG. 3C. The duty cycle of the first grating portion 301 (a ratio of the first grating structural unit 3011 to the first grating period $A_1$) varies in the X direction. In some embodiments, the duty cycle of the first grating portion 301 may be increasingly small as the first grating portion gradually approaches the optical fiber 310. With such an arrangement, the equivalent refractive index of the subwavelength grating can be made increasingly high in the direction away from the optical fiber 310, thereby helping convert the large mode field mode spot into the small mode field mode spot. In some embodiments, the variation of the equivalent refractive index of the subwavelength grating may be linear or nonlinear.

The mode spot conversion efficiency of the subwavelength grating is related to the mode field size of the optical fiber, and the material and structure of the subwavelength grating. After the specification of the optical fiber and the material of the subwavelength grating are selected, structural parameters, such as a size and corresponding duty cycle of the grating structural unit, of the subwavelength grating that meet the coupling efficiency requirements (for example, meet the optimal coupling efficiency) can be calculated using the finite-difference time-domain (FDTD) method.

In some embodiments, a duty cycle of the second grating portion 302 may remain unchanged.

In some embodiments, the first grating period may be equal to the second grating period. For example, as shown in FIG. 3C, the first grating period is $A_1$, and the second grating period is $A_2$. The first grating period $A_1$ may be the same as the second grating period $A_2$. In some other embodiments, alternatively, the first grating period $A_1$ may be different from the second grating period $A_2$. Flexibly setting the relationship between the first grating period and the second grating period can implement flexible control of the mode spot of the transmitted light.

Figure 4:
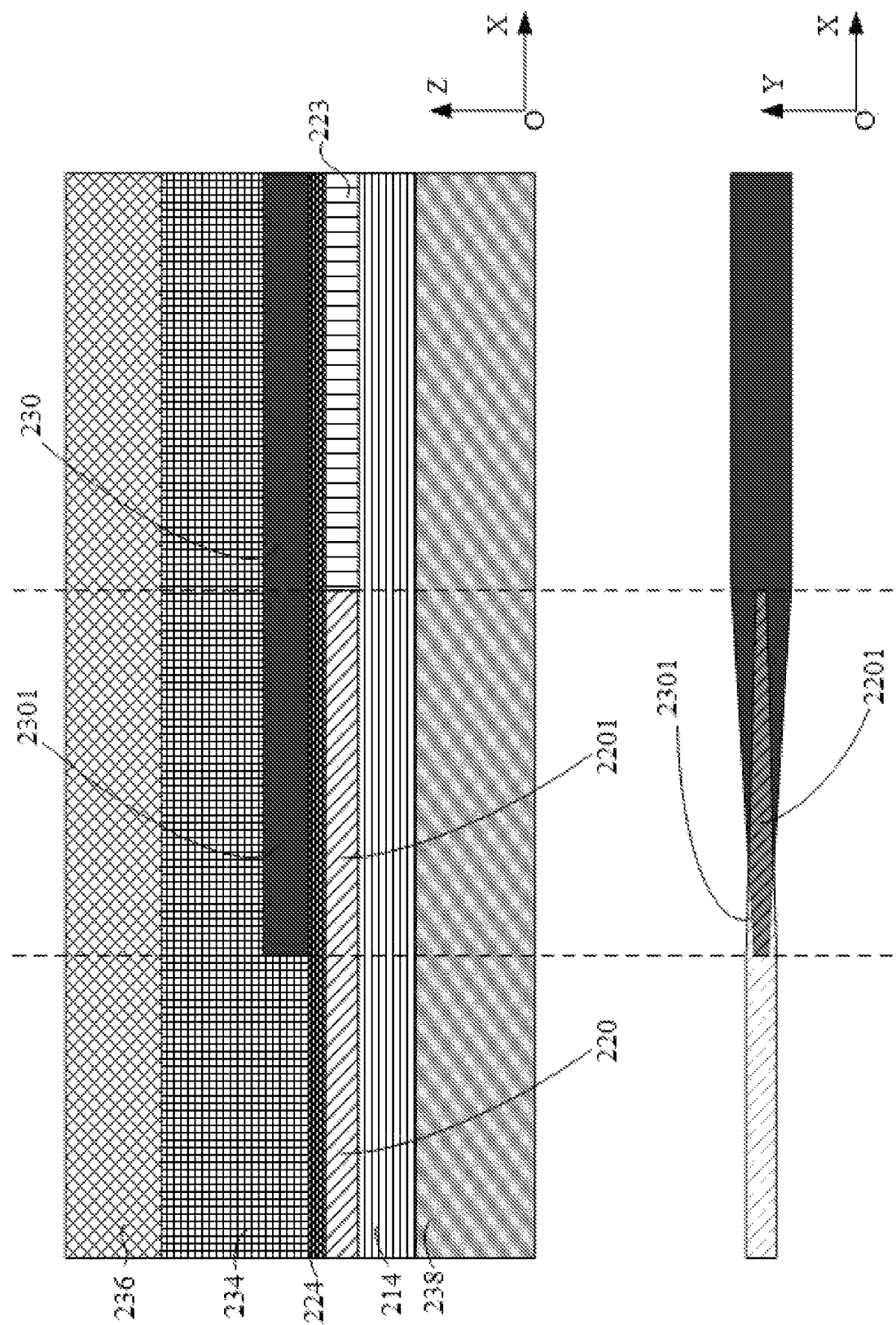
FIG. 4 is a schematic diagram of a partial structure of an edge coupler according to an embodiment of the present disclosure.

Light in the optical fiber propagates in the subwavelength grating and then enters the transmission waveguide, and enters the first waveguide through at least part of the transmission waveguide. The transmission process of light between the transmission waveguide and the first waveguide is described below with reference to FIG. 4. FIG. 4 is a schematic diagram of a partial structure of an edge coupler according to an embodiment of the present disclosure.

In some embodiments, as shown in FIG. 4, at least part of the transmission waveguide 230 of the second waveguide in the edge coupler includes a tapered structure 2301, and at least part of the first waveguide 220 includes a tapered structure 2201. The tapered structure 2301 of the transmission waveguide 230 tapers in the direction away from the optical fiber, and the tapered structure 2201 of the first waveguide 220 tapers in the direction toward the optical fiber. FIG. 4 further shows the fourth dielectric layer 238, the insulating layer 214, the first dielectric layer 223, the second dielectric layer 224, the third dielectric layer 234, and the carrier substrate 236 of the edge coupler.

The tapered structure 2301 of the transmission waveguide 230 and the tapered structure 2201 of the first waveguide 220 can constitute a vertical coupling structure that can efficiently couple an optical signal in the transmission waveguide 230 into the first waveguide 220.

In some embodiments, the tapered structure of the transmission waveguide and the tapered structure of the first waveguide may be linearly tapered structures, hyperbolic tapered structures, or parabolic-like tapered structures.

As shown in FIG. 4, as the width of the tapered structure 2301 of the transmission waveguide 230 gradually decreases, the mode spot of the optical signal transmitted in the transmission waveguide 230 gradually becomes larger, so that the coupling to the tapered structure 2201 of the first waveguide 220 can occur in a mode of the evanescent field. Due to the variation of the width of the tapered structure 2201, the light coupled into the tapered structure 2201 is gradually converted into a mode that can be bound by the first waveguide 220, thereby finally implementing efficient optical coupling of the optical fiber to the first waveguide 220.

In some embodiments, as shown in the lower part of FIG. 4, the tapered structure 2301 of the transmission waveguide 230 and the tapered structure 2201 of the first waveguide 220 may be aligned on the X-Y plane. For example, in the X direction, the lengths of the two tapered structures are the same, and in the Y direction, the two tapered structures overlap with each other.

According to an embodiment of the present disclosure, an edge coupler is further provided. The edge coupler may be fabricated using the above-described method.

In some embodiments, an operating band of the edge coupler formed using the fabrication method according to the embodiment of the present disclosure may be O-band, S-band, C-band, or L-band.

In some embodiments, the total length of the edge coupler may be determined based on the efficiency of coupling between the edge coupler and the optical fiber. For example, the total length of the edge coupler that meets the desired coupling efficiency (e.g., maximum coupling efficiency) can be calculated using the finite-difference time-domain (FDTD) method.

A polarization mode of the edge coupler fabricated using the method according to the embodiment of the present disclosure may be configured to support one of the group consisting of TE mode; TM mode; and both TE mode and TM mode. In this way, the edge coupler can be applied to various modes, and the applicable scope of the coupler can be expanded.

Although the present disclosure has been illustrated and described in detail in the drawings and the foregoing description, such illustration and description should be considered illustrative and schematic, rather than limiting; and the present disclosure is not limited to the disclosed embodiments. By studying the drawings, the disclosure, and the appended claims, those skilled in the art can understand and implement modifications to the disclosed embodiments when practicing the claimed subject matter. In the claims, the word "comprising" does not exclude other elements or steps not listed, the indefinite article "a" or "an" does not exclude plural, and the term "a plurality of" means two or more. The mere fact that certain measures are recited in mutually different dependent claims does not indicate that a combination of these measures cannot be used to get benefit.

What is claimed is:
1. A fabrication method for an edge coupler, the method comprising:
   providing a semiconductor-on-insulator substrate, wherein the semiconductor-on-insulator substrate comprises a first substrate, an insulating layer on the first substrate, and a semiconductor layer on the insulating layer;
   patterning the semiconductor layer to form a first waveguide;
   forming a first dielectric layer on the insulating layer, wherein a surface of the first dielectric layer is substantially flush with a surface of the first waveguide;
   forming a second dielectric layer on the first dielectric layer and the first waveguide;
   forming a second waveguide on the second dielectric layer;
   forming a third dielectric layer covering the second waveguide;
   bonding a carrier substrate to the third dielectric layer on a side of the third dielectric layer away from the second waveguide;
   removing the first substrate; and
   forming a fourth dielectric layer on a surface of the insulating layer.

2. The method according to claim 1, further comprising:
forming a barrier layer on the semiconductor layer prior to the patterning of the semiconductor layer,
wherein the patterning of the semiconductor layer to form a first waveguide comprises:
patterning the barrier layer and the semiconductor layer to form the first waveguide.

3. The method according to claim 2, wherein the forming the first dielectric layer on the insulating layer comprises:
forming a first dielectric material layer covering the barrier layer and the insulating layer; and
planarizing the first dielectric material layer to remove the barrier layer until the surface of the first dielectric layer is substantially flush with the surface of the first waveguide, thereby forming the first dielectric layer.

4. The method according to claim 1, wherein the forming the second waveguide on the second dielectric layer comprises:
forming a second waveguide material layer on the second dielectric layer; and
patterning the second waveguide material layer to form the second waveguide.

5. The method according to claim 1, wherein the first waveguide is made of a material selected from a group comprising silicon, silicon oxynitride, silicon nitride, lithium niobate, polymer, and indium phosphide.

6. The method according to claim 1, wherein the second waveguide is made of silicon nitride or silicon oxynitride.

7. The method according to claim 1, wherein the first dielectric layer is made of a material selected from a group comprising oxide, oxynitride, and polymer.

8. The method according to claim 1, wherein the second dielectric layer, the third dielectric layer, and the fourth dielectric layer are made of a material selected from a group comprising oxide, thermal oxide, and nitride.

9. An edge coupler, comprising:
a first waveguide;
a first dielectric layer adjacent to the first waveguide, wherein a surface of the first dielectric layer is substantially flush with a surface of the first waveguide;
a second dielectric layer on the first waveguide and the first dielectric layer;
a second waveguide on the second dielectric layer;
a third dielectric layer covering the second waveguide;
a carrier substrate on the third dielectric layer;
an insulating layer under the first waveguide and the first dielectric layer; and
a fourth dielectric layer under the insulating layer.

10. The edge coupler according to claim 9, wherein the second waveguide comprises a conversion waveguide and a transmission waveguide,
wherein the conversion waveguide is configured to perform mode spot conversion on light received from an optical fiber, and transmit the light subjected to the mode spot conversion to the transmission waveguide, and
wherein at least part of the transmission waveguide is vertically aligned with at least part of the first waveguide to couple light transmitted in the transmission waveguide into the first waveguide.

11. The edge coupler according to claim 10, wherein
at least part of the conversion waveguide gradually decreases in size in a direction perpendicular to a direction toward the optical fiber.

12. The edge coupler according to claim 11, wherein the conversion waveguide is a linear tapered waveguide, a nonlinear tapered waveguide, or a subwavelength grating.

13. The edge coupler according to claim 12, wherein the conversion waveguide is a subwavelength grating,
wherein the subwavelength grating comprises a first grating portion and a second grating portion,
wherein the first grating portion comprises a plurality of first grating structural units arranged with a first grating period, and the plurality of first grating structural units gradually decrease in size in the direction toward the optical fiber and the direction perpendicular to the direction toward the optical fiber, and
wherein the second grating portion comprises a plurality of second grating structural units arranged with a second grating period and a tapered unit connected to the plurality of second grating structural units, the plurality of second grating structural units are of same size, and the tapered unit tapers in the direction toward the optical fiber.

14. The edge coupler according to claim 13, wherein
a geometric size of a first grating structural unit closest to the optical fiber among the plurality of first grating structural units is determined based on a mode spot diameter of the optical fiber.

15. The edge coupler according to claim 13, wherein
an end face of the first grating structural unit closest to the optical fiber among the plurality of first grating structural units is square.

16. The edge coupler according to claim 13, wherein
a duty cycle of the first grating portion varies in the direction toward the optical fiber.

17. The edge coupler according to claim 13, wherein
a duty cycle of the second grating portion remains unchanged.

18. The edge coupler according to claim 13, wherein
the first grating period is equal to the second grating period.

19. The edge coupler according to claim 10, wherein the at least part of the transmission waveguide comprises a tapered structure, and the at least part of the first waveguide comprises a tapered structure, and
wherein the tapered structure of the transmission waveguide tapers in a direction away from the optical fiber, and the tapered structure of the first waveguide tapers in the direction toward the optical fiber.

20. The edge coupler according to claim 19, wherein
the tapered structure of the transmission waveguide and the tapered structure of the first waveguide are linearly tapered structures, hyperbolic tapered structures, or parabolic-like tapered structures.

* * * * *